United States Patent [19]

Okazaki et al.

[11] 4,454,644
[45] Jun. 19, 1984

[54] METHOD OF MAKING A CLAMP

[75] Inventors: Yoichiro Okazaki, Sagamihara; Shigeaki Akazawa, Isehara, both of Japan

[73] Assignees: Mitsubishi Jukogyo Kabushiki Kaisha; The Yokohama Rubber Co., Ltd., both of Tokyo, Japan

[21] Appl. No.: 443,650

[22] Filed: Nov. 22, 1982

[30] Foreign Application Priority Data

Nov. 26, 1981 [JP] Japan ................. 56-188399

[51] Int. Cl.$^3$ ............................................. B23P 11/00
[52] U.S. Cl. ................... 29/440; 24/20 R; 24/21; 29/439; 29/463; 29/150
[58] Field of Search ............. 29/439, 440, 463, 150; 24/20 R, 21

[56]  References Cited
U.S. PATENT DOCUMENTS

| 112,375 | 3/1871 | Perkins | 24/21 |
| 120,727 | 11/1871 | Downes | 24/20 R |
| 1,440,658 | 1/1923 | Coapman | 29/463 |
| 2,140,764 | 12/1938 | Reiter | 29/440 X |
| 2,469,949 | 5/1949 | Cantrell | 29/150 |
| 2,697,274 | 12/1954 | Merrill | 29/150 X |
| 2,708,307 | 5/1955 | Newell et al. | 29/463 |
| 3,020,631 | 2/1962 | Kennedy | 29/150 X |
| 3,252,728 | 5/1966 | Holton | 24/21 X |
| 3,303,669 | 2/1967 | Oetiker | 24/20 R X |
| 4,106,799 | 8/1978 | Oetiker | 24/20 R X |

FOREIGN PATENT DOCUMENTS 958534  9/1949  France ................. 24/21

Primary Examiner—Charlie T. Moon
Assistant Examiner—Ronald S. Wallace
Attorney, Agent, or Firm—Wenderoth, Lind & Ponack

[57] ABSTRACT

A method of making a clamp used for a supercharger in an internal combustion engine is initiated by cutting out an unworked clamp half from a plate material. The half is then formed such that it is semicircular in front elevation and the opposite ends extend outwardly. Other clamp half is made in the same manner. An unworked link is cut out from a plate material and then its plane strain is corrected. Further, the link is chamfered and hardened. The halves are arranged in circle and the worked link is inserted into one ends of the halves. Finally, these ends are curled around the link.

3 Claims, 15 Drawing Figures

METHOD OF MAKING A CLAMP

FIELD OF THE INVENTION

The present invention relates to a method of making a clamp and, more particularly, to a method of making a clamp used for securing casings of a supercharger used in an internal combustion engine. Still more particularly, the invention relates to a method for making a clamp for securing a turbine casing and a bearing casing together or securing a turbine casing and a compressor casing together.

BACKGROUND OF THE INVENTION

Heretofore, a clamp used in a supercharger has been manufactured as follows. Referring to FIGS. 1-3, there are shown a retainer (a) which is imperfectly circular in front elevation and can have a gutterlike cross section (FIG. 2), straps ($b_1$) and ($b_2$), a trunnion body (c), a trunnion cap (d), a T-shaped bolt, and a nut (f). Retainers as indicated by "a" are successively made by forming a band of stainless steel into a plurality of portions having a given shape with a multistage roll former and then trimming them to a given length. An unworked strap provided with a hole into which the T-shaped bolt (e) fits is blanked out from a band of stainless steel with a punching die, and then it is partially bent into a loop to make the strap ($b_1$) or ($b_2$) which is still flat except for the looped portion. The trunnion body (c) and the trunnion cap (d) are also made in a similar way. To be specific, an unworked member is blanked out from a sheet of stainless steel with a punching die, and then it is formed into a given shape with a press forming die to obtain the trunnion body (c) or trunnion cap (d). The trunnion cap (d) is press fitted into the trunnion body (d) by a press machine for assembly. The T-shaped bolt (d) is inserted into the looped portion of the strap ($b_1$) so that the T-shaped head of the bolt is free to move, and other flat portions of the strap are secured together as by spot welding. The trunnion body (d) is inserted into the looped portion of the strap ($b_2$) and anchored to this portion as by spot welding. The straps ($b_1$) and ($b_2$) into which the T-shaped bolt (e) and the trunnion body (c) are incorporated, respectively, are bent by a press machine so that they conform to the outer dimension and shape of the retainer (a), thus completing the preparation for the components.

The assembling operations are initiated by mounting the retainer (a) on a jig which can set the outer diameter of the retainer. Then, the strap ($b_1$) incorporating the T-shaped bolt (e) is secured on one end of the retainer (a) and the strap ($b_2$) incorporating the trunnion body (c) is secured on the outer end with jigs, and their respective pluarlity of locations are secured by spot welding. Then, these components are removed from the jigs and the threaded T-shaped bolt (e) is screwed into the trunnion body (c), and then the nut (f) which has been already prepared is screwed into the threaded portion of the bolt (e), thus completing the assemblying operations.

The aforementioned clamp for supercharger has problems: (i) It has a number of components requiring a large number of steps to manufacture and so the whole manufacturing process is complex; (ii) The conditions in which spot weldings are effected well are difficult to seek for, and the control of the components is required to be done sufficiently carefully; (iii) Spot weldings need special jigs, which together with the above respects (i) and (ii) increases the manufacturing cost of the clamp for supercharger. Further disadvantageously, small clamps whose diameters are less than 100 mm cannot be manufactured easily, because the multistage roll former is used to form the retainer (a).

SUMMARY OF THE INVENTION

Accordingly, it is an object of the present invention to provide an improved method capable of making a high quality clamp having a smaller diameter at a smaller cost.

This object is accomplished in accordance with the principles of the invention by providing a method of making a clamp for supercharger, the method comprising the steps of cutting out an unworked half of the clamp from a plate material with a press machine; forming the unworked half such that it is semicircular in shape when viewed from the front and the opposite ends thereof extend outwardly along an imaginary line, which passes through the center of the semicircle and the vicinities of the opposite ends, and that the other portions except for one end thereof can have a cross section like a gutter; cutting out an unworked link from a plate material and then applying a compressive force to the unworked link to correct the plane strain in it and to harden the link; making other half of the clamp in the same manner; arranging the halves of the clamp substantially in circle; fitting the link into one ends of the halves of the clamp; and curling the one ends of the halves around the fitted link, whereby the halves are assembled via the link.

DETAILED DESCRIPTION OF THE INVENTION

Figure 1:
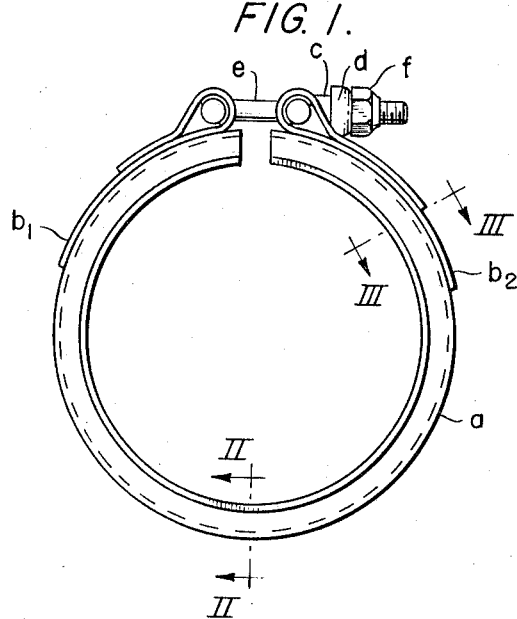
FIG. 1 is a side elevation of a prior art clamp for supercharger.
Figure 2:
FIG. 2 is a longitudinal sectional view taken along line II—II of FIG. 1.
Figure 3:
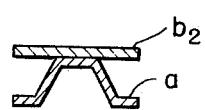
FIG. 3 is a longitudinal sectional view taken along line III—III of FIG. 1.
Figure 6:
FIG. 6 is a longitudinal sectional view taken along line VI—VI of FIG. 4.
Figure 5:
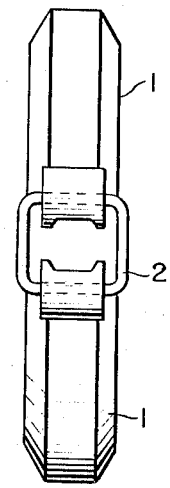
FIG. 5 is another side elevation of the clamp.
Figure 4:
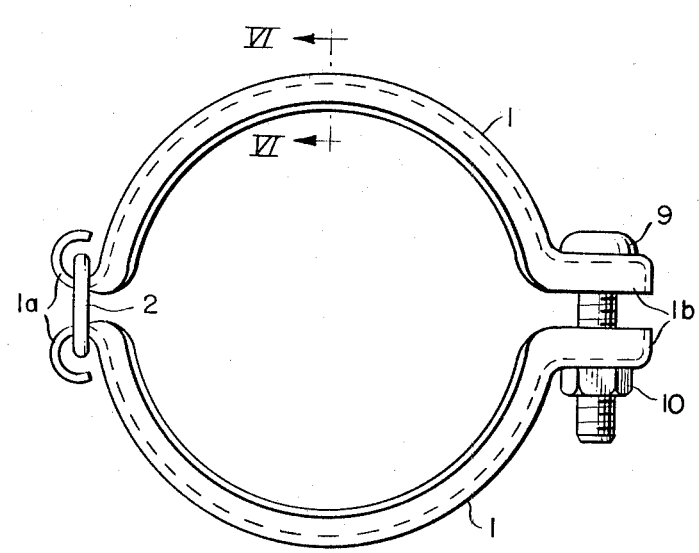
FIG. 4 is a side elevation of a clamp manufactured by the method according to the present invention.
Figure 7:
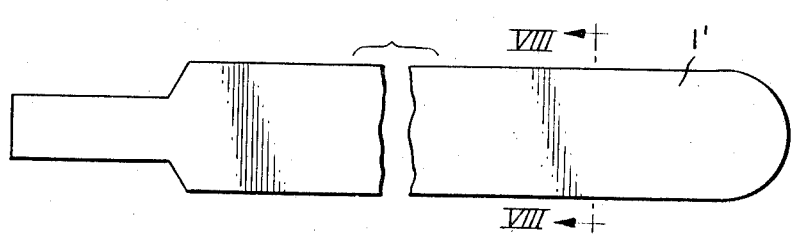
FIG. 7 is a plan view of an unworked clamp half.
Figure 8:
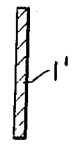
FIG. 8 is a longitudinal sectional view taken along line VIII—VIII of FIG. 7.
Figure 9:
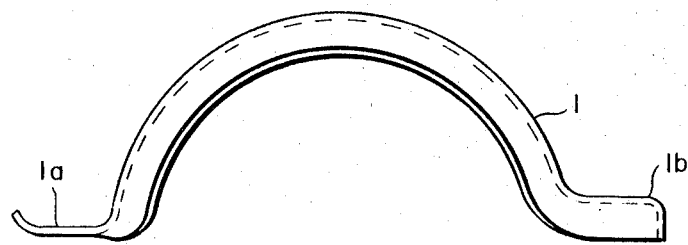
FIG. 9 is a side elevation of the clamp half.
Figure 10:
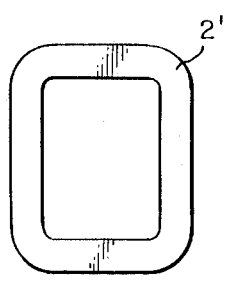
FIG. 10 is a side elevation of an unworked link.
Figure 11:
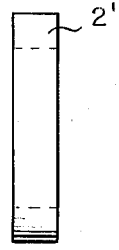
FIG. 11 is another side elevation of the link.

A novel method of making a clamp, which is used in a supercharger in this example, is now described with reference to FIGS. 4-15. Referring first to FIGS. 4-6, the construction of the clamp for supercharger to be manufactured is shown. A pair of clamp halves 1 forms a circle and each is semicircular in shape when viewed from the front. The opposite ends 1a and 1b of each half extend outwardly along an imaginary line (not shown), which passes through the center of the semicircle and the vicinities of the opposite ends. One end 1a is curled in the final assembling step as described later, and the other portions except for the one end 1a can have a cross section like a gutter as shown in FIG. 6. The one ends 1a of the halves 1 are joined together by a link 2, and a bolt 9 having a rectangular head base extends through the other ends 1b of the halves. A nut 10 is screwed into the threaded portion of the bolt 9.

The manner in which the aforesaid clamp for supercharger is manufactured is now described. Each unworked clamp half 1' (FIGS. 7 and 8) is blanked out from a band of stainless steel having a thickness of about 2 mm with a punching die. Then, this half 1' is formed with a press forming die such that it is semicircular in shape when viewed from the front and the opposite ends 1a and 1b extend outwardly along the aforementioned imaginary line and that the other portions except for the one end 1a can have a cross section like a gutter (see FIG. 9). A rectangular hole through which the shank of the bolt 9 having a rectangular contour extends is made in the other end 1b of the half 1 with a punching die. The pair of clamp halves 1 used in the final assembling step are identical in shape, construction and size.

Figure 12:
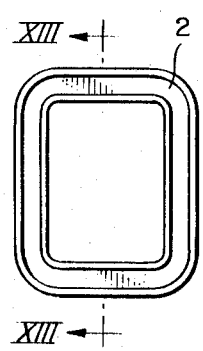
FIG. 12 is a side elevation of a worked link.
Figure 13:
FIG. 13 is a longitudinal sectional view taken along line XIII—XIII of FIG. 11.

An unworked link 2' (FIGS. 10 and 11) is blanked out from a sheet of stainless steel with a punching die, and then a compressive force is applied to the link 2' with a press forming die to correct the plane strain in it and to chamfer the link 2' and, at the same time, it is hardened (FIGS. 12 and 13). Accordingly, a sheet of austenite stainless steel, which can be readily cut off and easily hardened when a force is applied to it, is appropriate as a material of the link 2'.

Figure 15:
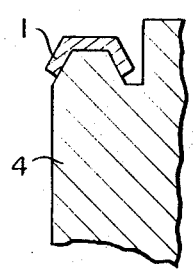
FIG. 15 is a longitudinal sectional view taken along line XV—XV of FIG. 13.
Figure 14:
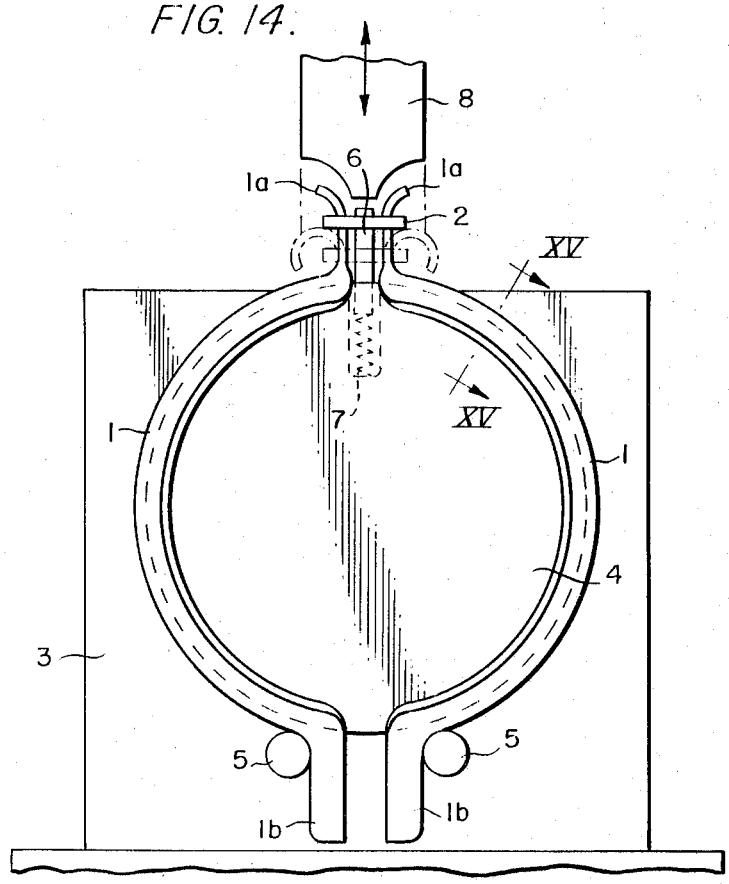
FIG. 14 is a front elevation of the clamp illustrating an assembling step.

Referring next to FIGS. 14 and 15, these components 1 and 2 are fed to an assembling machine and assembled using this in the final assembling step. This assembling machine includes the body 3 of this machine, a mandrel 4 protruding from the body 3 and having a circular contour, a pair of pins 5 protruding from the body 3 just below the mandrel 4, a supporting pin 6 which is inserted into a slot in the mandrel 4 so that it can move up and down in the slot, a spring 7 biasing the supporting pin 6 upward, and a curling punch 8.

In the assembling step, the clamp halves 1 are fitted oppositely to the mandrel 4, and the ends 1b of the halves 1 are fixed by their respective pins 5 so that the halves are arranged substantially in circle. Then, the link 2 is inserted into the ends 1a of the halves while supported by the pin 6 so as not to fall off. Thereafter, the curling punch 8 is lowered to curl the ends 1a of the halves 1 around the link 2. At this time the supporting pin 6 and the link 2 assist this operation by lowering themselves against the biasing force of the spring 7. After the halves 1 have been coupled together via the link 2 in this manner, the assembly is removed from the mandrel 4 and the bolt 9 is inserted into the rectangular holes in the halves 1, and then the nut is tightened on the threaded portion of the bolt 9, thus completing all the steps.

As stated above, the method according to the present invention comprises the steps of: cutting out an unworked half (1') of a clamp from a plate material with a press machine; forming the unworked half (1') such that it is semicircular in shape when viewed from the front and the opposite ends thereof extend outwardly along an imaginary line, which passes through the center of the semicircle and the vicinities of the opposite ends, and that the other portions except for one end of the half can have a cross section like a gutter; cutting out an unworked link (2') from a plate material and then applying a compressive force to the unworked link to correct the plane strain in it and chamfering the link and hardening it; making other half of the clamp in the same manner as said half is made; arranging the halves (1) of the clamp substantially in circle; fitting the link (2) which has been machined and treated as aforementioned into one ends (1a) of the halves of the clamp; and curling said one ends (1a) of the halves (1) around the link (2), whereby the halves (1) are assembled via the link (2).

Thus, the novel method requires a smaller number of manufacturing steps than conventional and does not need special operation including spot welding, whereby permitting decrease in the manufacturing cost. Also, in contrast with the aforementioned prior art method of making a clamp for supercharger in which a multistage roll former is used to make a retainer thus rendering the manufacturing of smaller clamps difficult, the present invention uses clamp halves to allow the forming with a press punching die, whereby smaller retainers can be manufactured. Further, all the components are formed with press dies, and therefore the resultant clamp will be excellent in quality. Furthermore, as one clamp consists of a pair of clamp halves, which are identical in shape, construction and dimension, and a link, only two sets of press dies, that is, press dies for clamp halves and press dies for link, are necessary to make these members, resulting in decrease in expenditure on press dies. The improved method is economical also in this respect and very effective not only for clamps for supercharger but for other clamps.

Although the invention has been described in its preferred form with a certain degree of particularity, it is to be understood that various changes and modifications may by made thereto without departing from the spirit and scope of the invention.

What is claimed is:

1. A method of making a clamp, comprising the steps of:

cutting out an unworked half of the clamp from a metal plate material with a press machine, forming the unworked half such that it is semicircular in shape when viewed from the front and the opposite ends thereof extend outwardly along an imaginary line, which passes through the center of the semicircle and the vicinities of the opposite ends, and that the other portions except for one end thereof can have a cross section like a gutter, cutting out an unworked closed link from a metal plate material and then applying a compressive force to the unworked link to correct the plane strain in it and to harden the link, making the other half of the clamp in the same manner, arranging the halves of the clamp substantially in circle, fitting said link onto said one end of each of the halves of the clamp, and curling said one ends of the halves around the fitted link, whereby the halves are interlockingly assembled in a pivotable relationship via the link.

2. A method of making a clamp as set forth in claim 1, further comprising the step of chamfering said unworked link.

3. A method of making a clamp as set forth in claim 1, wherein said plate material from which the unworked link is cut out is a sheet of austenite stainless steel.

* * * * *